(12) United States Patent
Kurdi et al.

(10) Patent No.: US 10,336,555 B1
(45) Date of Patent: Jul. 2, 2019

(54) BAGGAGE HANDLING AND DELIVERY SYSTEM

(71) Applicant: KING SAUD UNIVERSITY, Riyadh (SA)

(72) Inventors: Heba Abdullatif Kurdi, Riyadh (SA); Mohannad Yousef Abdulghani, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 16/216,860

(22) Filed: Dec. 11, 2018

(51) Int. Cl.
| | | |
|---|---|---|
| *B65G 47/22* | (2006.01) |
| *B65G 47/46* | (2006.01) |
| *B65G 47/51* | (2006.01) |
| *B65G 47/64* | (2006.01) |
| *B64F 1/36* | (2017.01) |

(52) U.S. Cl.
CPC .............. *B65G 47/46* (2013.01); *B64F 1/368* (2013.01); *B65G 47/22* (2013.01); *B65G 47/5145* (2013.01); *B65G 47/64* (2013.01)

(58) Field of Classification Search
CPC .. B65G 47/684; B65G 47/5145; B65G 47/48; B65G 1/02; B65G 1/0485; B65G 47/46; B65G 47/64; B65G 47/22
USPC ............................................. 198/580, 347.4
See application file for complete search history.

(56) References Cited

U.S. PATENT DOCUMENTS

| | | | | |
|---|---|---|---|---|
| 3,181,713 A | * | 5/1965 | Blankenship, Jr. ..... | B07C 3/006 198/347.4 |
| 3,379,321 A | | 4/1968 | Weir | |
| 3,695,462 A | | 10/1972 | Sullivan | |
| 3,915,284 A | * | 10/1975 | Knockeart .............. | B64F 1/368 198/349 |
| 4,106,636 A | * | 8/1978 | Ouimet ................... | B07C 3/082 104/88.03 |
| 5,222,855 A | | 6/1993 | Bernard, II et al. | |
| 5,308,001 A | * | 5/1994 | Grecksch .............. | D01H 9/187 198/347.4 |

(Continued)

FOREIGN PATENT DOCUMENTS

WO 2012066346 A1 5/2012

OTHER PUBLICATIONS

Zhang et al. "Traceable Air Baggage Handling System Based on RFID Tags in the Airport." Journal of Theoretical and Applied Electronic Commerce Research. vol. 3, Iss 1, Apr. 2008, 106-115.

(Continued)

*Primary Examiner* — James R Bidwell
(74) *Attorney, Agent, or Firm* — Richard C. Litman

(57) ABSTRACT

The baggage handling and delivery system provides a plurality of secure pickup stations for individual passengers to receiver their baggage. A plurality of interconnected conveyer belts are used to create a variety of different routes for baggage to follow, with each individual route terminating at a pickup station. Each baggage item is provided with an identifier, such as a bar code, a radio frequency identification (RFID) tag or the like, such that each item of baggage associated with an individual passenger is routed to the specific pickup station assigned to that passenger. Under guidance of a connected controller, each item of baggage entering the baggage handling and delivery system is scanned and routed along a specific path to be received by the appropriate pickup station. Each pickup station is secure and accessible only to the assigned passenger.

20 Claims, 9 Drawing Sheets

(56) References Cited

U.S. PATENT DOCUMENTS

| | | | |
|---|---|---|---|
| 5,472,309 A * | 12/1995 | Bernard, II | B65G 1/0485 |
| | | | 414/807 |
| 5,934,444 A * | 8/1999 | Kierpaul | B64F 1/32 |
| | | | 198/465.1 |
| 7,270,226 B2 * | 9/2007 | Ostrom | B64F 1/368 |
| | | | 198/347.4 |
| 8,136,650 B2 * | 3/2012 | Frich | B65G 65/00 |
| | | | 198/349.6 |
| 8,258,926 B2 | 9/2012 | Bayer et al. | |
| 9,334,115 B2 | 5/2016 | Bartelet | |
| 2008/0105495 A1 | 5/2008 | Mazzoni et al. | |
| 2009/0299521 A1 | 12/2009 | Hansl et al. | |
| 2010/0076796 A1 | 3/2010 | Klein et al. | |
| 2011/0320036 A1 | 12/2011 | Freudelsperger | |

OTHER PUBLICATIONS

Ouyang et al. "An intelligent RFID reader and its application in airport baggage handling system." Wireless Communications, Networking and Mobile Computing, 2008. WiCOM'08. 4th International Conference on. IEEE, 2008.

\* cited by examiner

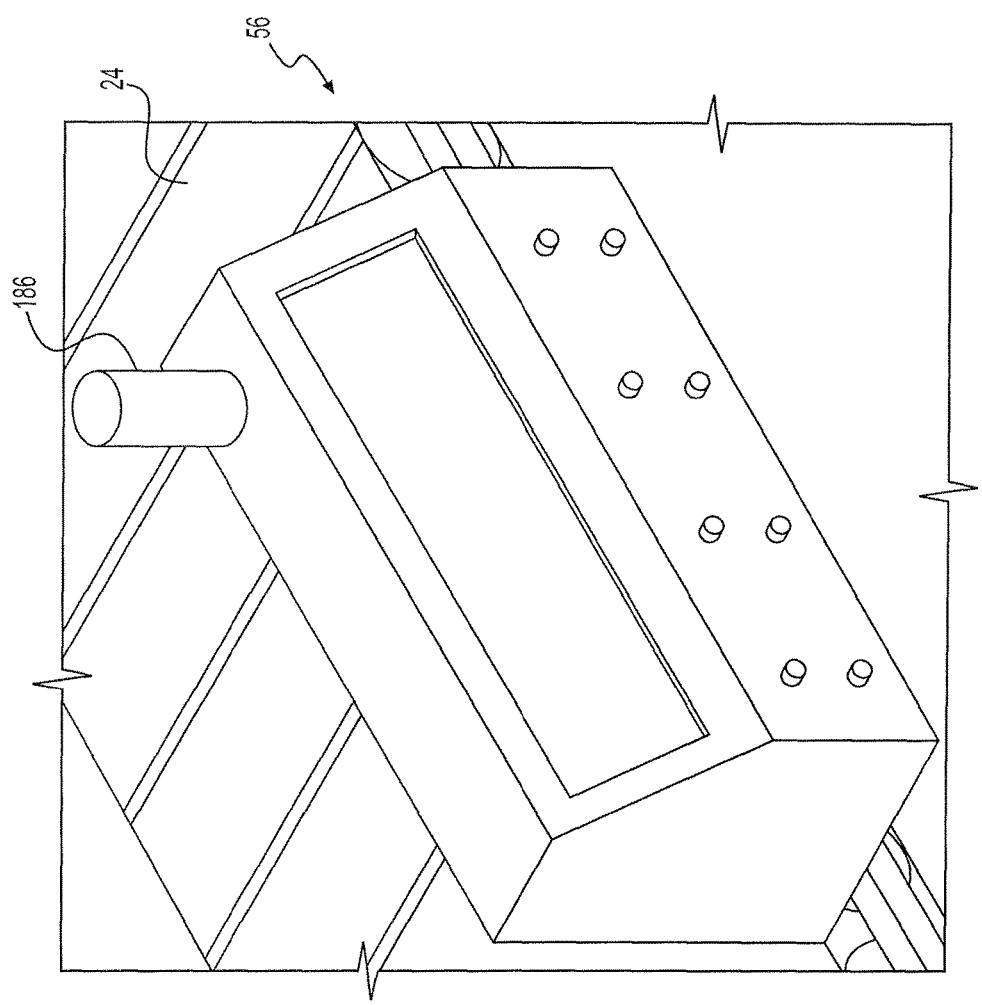

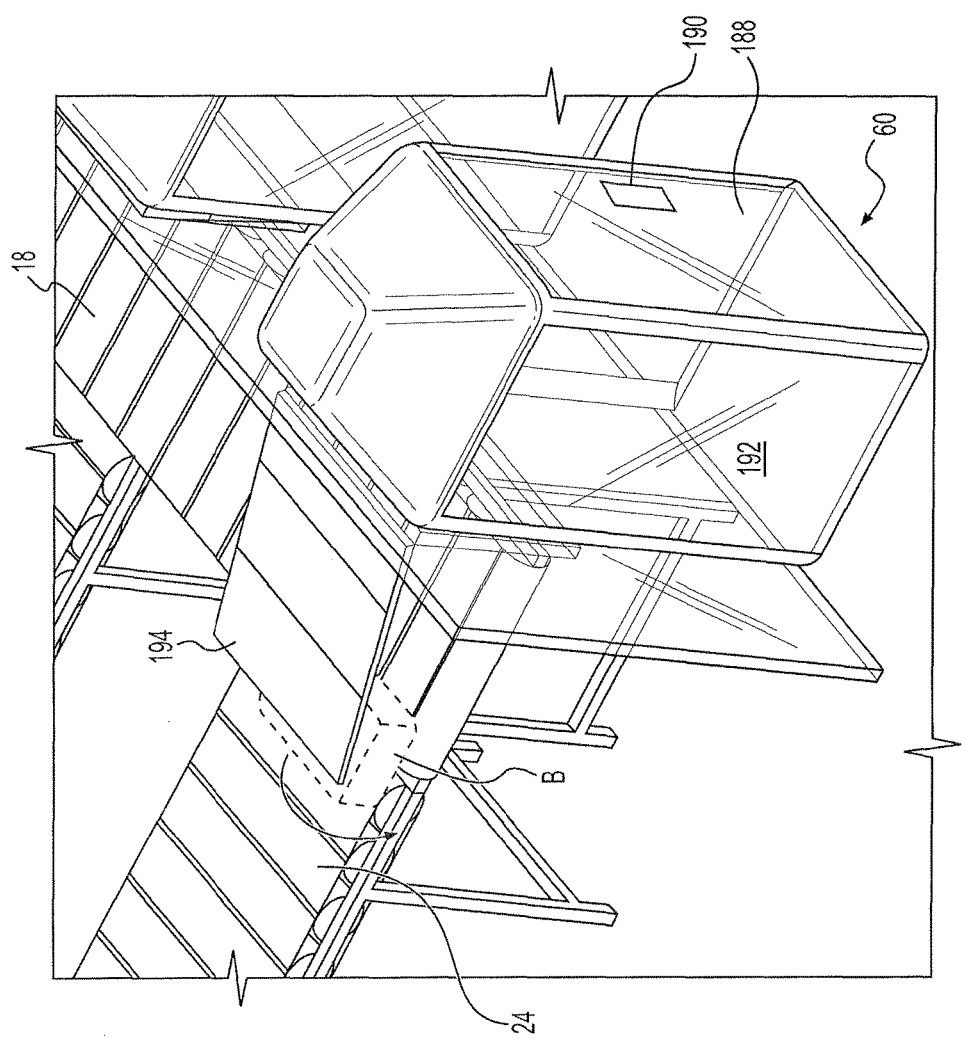

BAGGAGE HANDLING AND DELIVERY SYSTEM

BACKGROUND

1. Field

The disclosure of the present patent application relates to baggage handling, and particularly to a baggage handling and delivery system that provides a secure system for handling and delivering baggage to an authorized recipient.

2. Description of the Related Art

Conventional baggage handling systems, such as those commonly used at airports, have not changed in operation in decades. Baggage handling is largely non-automated, making use of baggage handling personnel who physically load luggage and other baggage items onto a conveyer belt or carrousel. All of the baggage associated with a particular flight is delivered to the same carrousel, without any individual sorting, and the baggage is available to pick up at any point on its route, regardless of the presence of the owner. This lack of automation and security has caused theft of unattended bags to become a serious problem over the years. Authorization to leave with a piece of baggage is typically granted by an antiquated baggage check system, requiring an attendant to visually inspect individual luggage tags. The attendants who discharge the bags to the pickup point are often too busy or distracted to insist that claimers produce their baggage check to verify ownership. Theft becomes a particularly acute problem in those cases in which the baggage does not arrive on the same plane as the passenger.

The lack of automation and the need for manual assistance with, and control over, the bags that are deplaning have resulted in long delays for passengers and a greatly increased chance of having baggage stolen. In addition to theft, the potential for general tampering and/or the illicit insertion of contraband in baggage is a risk for the same reasons. Thus, a baggage handling and delivery system solving the aforementioned problems is desired.

SUMMARY

The baggage handling and delivery system provides a plurality of secure pickup stations for individual passengers to receiver their baggage. A plurality of interconnected conveyer belts are used to create a variety of different routes for baggage to follow, each individual route terminating at a pickup station. Each baggage item is provided with an identifier, such as a bar code, quick response (QR) code, a radio frequency identification (RFID) tag or the like, such that each item of baggage associated with an individual passenger is routed to the specific pickup station assigned to that passenger. Under guidance of a connected controller, each item of baggage entering the baggage handling and delivery system is scanned and routed along a specific path to be received by the appropriate pickup station. Each pickup station is secure and accessible only to the assigned passenger.

The baggage handling and delivery system has a first laterally extending conveyer belt having opposed first and second ends. The first laterally extending conveyer belt is adapted to transport at least one baggage item along a first lateral direction. A scanner is positioned adjacent the first end of the first laterally extending conveyer belt for reading identifying information associated with the at least one baggage item. A second laterally extending conveyer belt has opposed first and second ends and is adapted to transport the at least one baggage item along a second lateral direction, where the second lateral direction is opposite the first lateral direction.

A first longitudinally extending conveyer belt has opposed first and second ends, the first end being positioned adjacent the second end of the first laterally extending conveyer belt. The second end of the first longitudinally extending conveyer belt is positioned adjacent the first end of the second laterally extending conveyer belt. The first longitudinally extending conveyer belt is adapted to transport the at least one baggage item along a first longitudinal direction. A second longitudinally extending conveyer belt has opposed first and second ends, the first end being positioned adjacent the second end of the second laterally extending conveyer belt. The second end of the second longitudinally extending conveyer belt is positioned adjacent a central portion of the first laterally extending conveyer belt. The second longitudinally extending conveyer belt is adapted to transport the at least one baggage item along a second longitudinal direction, the second longitudinal direction being opposite the first longitudinal direction.

A third laterally extending conveyer belt has opposed first and second ends and is adapted to transport the at least one baggage item along the second lateral direction. The first end of the third laterally extending conveyer belt is positioned adjacent a central portion of the first longitudinally extending conveyer belt. A third longitudinally extending conveyer belt has opposed first and second ends and is adapted to transport the at least one baggage item along the first longitudinal direction. The first end of the third longitudinally extending conveyer belt is positioned adjacent the second end of the third laterally extending conveyer belt, and the second end of the third longitudinally extending conveyer belt is positioned adjacent a central portion of the second laterally extending conveyer belt.

A first pushing device is mounted adjacent an intersection between the first longitudinally extending conveyer belt and the first end of the third laterally extending conveyer belt. The first pushing device is provided to selectively push the at least one baggage item to divert the at least one baggage item from traveling on the first longitudinally extending conveyer belt to travel on the third laterally extending conveyer belt. A first pickup station is positioned adjacent an intersection between the second end of the first longitudinally extending conveyer belt and the second laterally extending conveyer belt for selectively receiving the at least one baggage item. Similarly, a second pickup station is positioned adjacent an intersection between the second end of the third longitudinally extending conveyer belt and the second laterally extending conveyer belt for selectively receiving the at least one baggage item, depending on the selected route for the at least one baggage item.

These and other features of the present disclosure will become readily apparent upon further review of the following specification and drawings.

BRIEF DESCRIPTION OF THE DRAWINGS

FIG. 2A is a perspective view of a pushing device of the baggage handling and delivery system, shown in a retracted state.

FIG. 3A, FIG. 3B and FIG. 3C are perspective views of a pickup station of the baggage handling and delivery system, illustrating successive steps for receiving a baggage item.

Similar reference characters denote corresponding features consistently throughout the attached drawings.

DETAILED DESCRIPTION OF THE PREFERRED EMBODIMENTS

Figure 1:
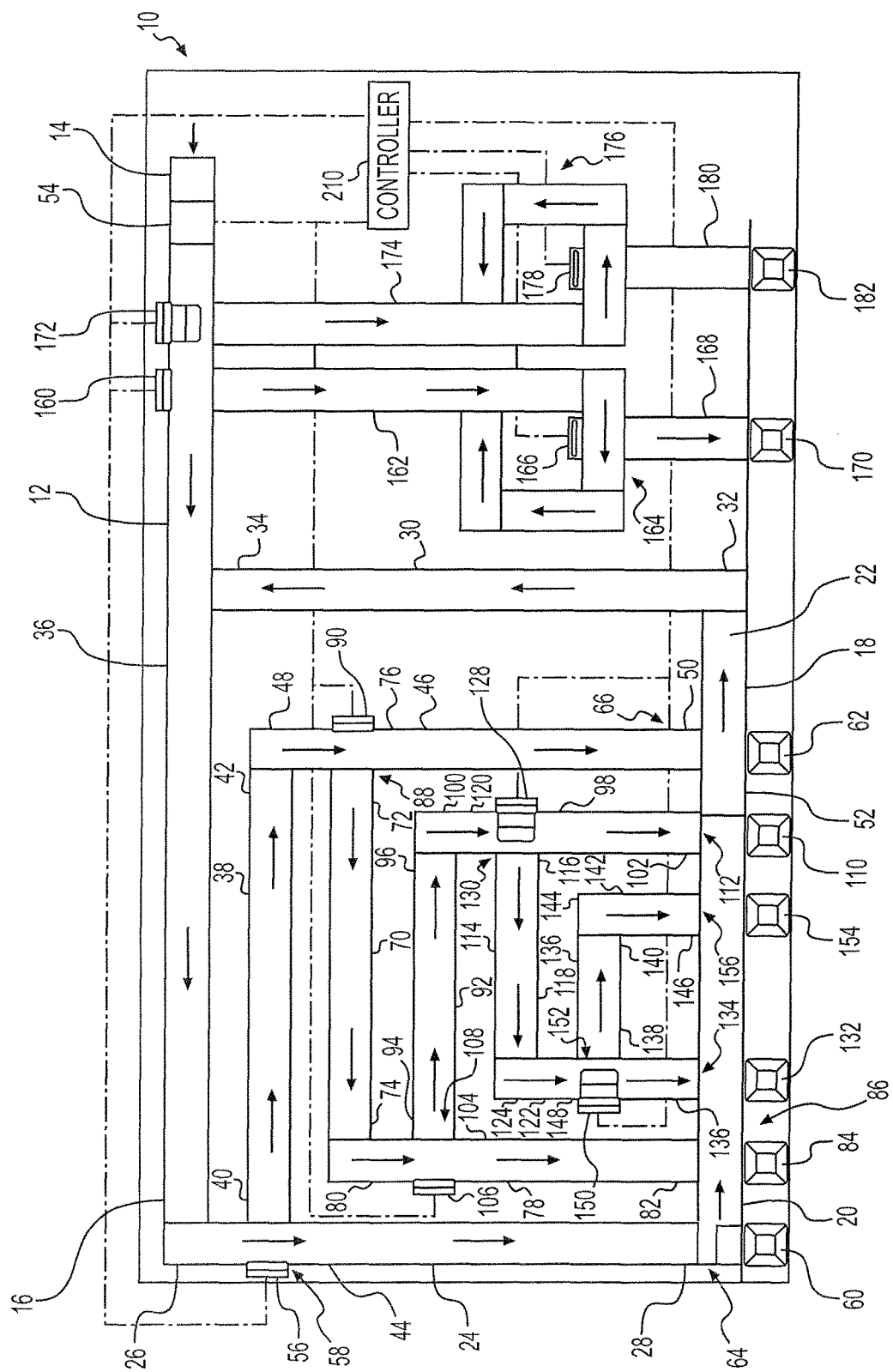
FIG. 1 is a plan view of a baggage handling and delivery system.

As shown in FIG. 1, the baggage handling and delivery system 10 has a first laterally extending conveyer belt 12 having opposed first and second ends 14, 16, respectively. The first laterally extending conveyer belt 12 is adapted to transport at least one baggage item along a first lateral direction (to the left in the exemplary orientation of FIG. 1). A scanner 54 is positioned adjacent the first end 14 of the first laterally extending conveyer belt 12 for reading identifying information associated with the at least one baggage item. A second laterally extending conveyer belt 18 has opposed first and second ends 20, 22, respectively, and is adapted to transport the at least one baggage item along a second lateral direction, the second lateral direction being opposite the first lateral direction (i.e., to the right in the exemplary orientation of FIG. 1).

A first longitudinally extending conveyer belt 24 has opposed first and second ends 26, 28, respectively, the first end 26 being positioned adjacent the second end 16 of first laterally extending conveyer belt 12. The second end 28 of the first longitudinally extending conveyer belt 24 is positioned adjacent the first end 20 of the second laterally extending conveyer belt 18. The first longitudinally extending conveyer belt 24 is adapted to transport the at least one baggage item along a first longitudinal direction (downward in the exemplary orientation of FIG. 1). A second longitudinally extending conveyer belt 30 has opposed first and second ends 32, 34, respectively, the first end 32 being positioned adjacent the second end 22 of the second laterally extending conveyer belt 18. The second end 34 of the second longitudinally extending conveyer belt 30 is positioned adjacent a central portion 36 of the first laterally extending conveyer belt 12. The second longitudinally extending conveyer belt 30 is adapted to transport the at least one baggage item along a second longitudinal direction, the second longitudinal direction being opposite the first longitudinal direction (i.e., upward in the exemplary orientation of FIG. 1).

As further seen in FIG. 1, a third laterally extending conveyer belt 38 has opposed first and second ends 40, 42, respectively, and is adapted to transport the at least one baggage item along the second lateral direction (i.e., to the right in FIG. 1). The first end 40 of the third laterally extending conveyer belt 38 is positioned adjacent a central portion 44 of the first longitudinally extending conveyer belt 24. A third longitudinally extending conveyer belt 46 has opposed first and second ends 48, 50, respectively, and is adapted to transport the at least one baggage item along the first longitudinal direction (i.e., downward in FIG. 1). The first end 48 of the third longitudinally extending conveyer belt 46 is positioned adjacent the second end 42 of the third laterally extending conveyer belt 38, and the second end 50 of the third longitudinally extending conveyer belt 46 is positioned adjacent a central portion 52 of the second laterally extending conveyer belt 18.

A first pushing device 56 is mounted adjacent an intersection 58, which is an intersection between the first longitudinally extending conveyer belt 24 and the first end 40 of the third laterally extending conveyer belt 38. The first pushing device 56 is provided to selectively push the at least one baggage item to divert the at least one baggage item from traveling on the first longitudinally extending conveyer belt 24 to travel on the third laterally extending conveyer belt 38.

A first pickup station 60 is positioned adjacent an intersection 64, which is an intersection between the second end 28 of the first longitudinally extending conveyer belt 24 and the second laterally extending conveyer belt 18, for selectively receiving the at least one baggage item. Similarly, a second pickup station 62 is positioned adjacent an intersection 66, which is an intersection between the second end 50 of the third longitudinally extending conveyer belt 46 and the second laterally extending conveyer belt 18 for selectively receiving the at least one baggage item, depending on the selected route for the at least one baggage item.

A fourth laterally extending conveyer belt 70 has opposed first and second ends 72, 74, respectively, and is adapted to transport the at least one baggage item along the first lateral direction. The first end 72 of the fourth laterally extending conveyer belt 70 is positioned adjacent a central portion 76 of the third longitudinally extending conveyer belt 46. A fourth longitudinally extending conveyer belt 78 has opposed first and second ends 80, 82, respectively, and is adapted to transport the at least one baggage item along the first longitudinal direction. The first end 80 of the fourth longitudinally extending conveyer belt 78 is positioned adjacent the second end 74 of the fourth laterally extending conveyer belt 70, and the second end 82 of the fourth longitudinally extending conveyer belt 78 is positioned adjacent the central portion 52 of the second laterally extending conveyer belt 18.

As further shown in FIG. 1, a second pushing device 90 is mounted adjacent an intersection 88, which is an intersection between the first end 72 of the fourth laterally extending conveyer belt 70 and the third longitudinally extending conveyer belt 46. The second pushing device 90 is adapted to selectively push the at least one baggage item to divert the at least one baggage item from traveling on the third longitudinally extending conveyer belt 46 to travel on the fourth laterally extending conveyer belt 70. A third pickup station 84 is positioned adjacent an intersection 86, which is an intersection between the second end 82 of the fourth longitudinally extending conveyer belt 78 and the second laterally extending conveyer belt 18 for selectively receiving the at least one baggage item.

A fifth laterally extending conveyer belt 92 has opposed first and second ends 94, 96, respectively, and is adapted to transport the at least one baggage item along the second lateral direction. The first end 94 of the fifth laterally extending conveyer belt 92 is positioned adjacent a central portion 104 of the fourth longitudinally extending conveyer belt 78. A fifth longitudinally extending conveyer belt 98 has opposed first and second ends 100, 102, respectively, and is adapted to transport the at least one baggage item along the first longitudinal direction. The first end 100 of the fifth longitudinally extending conveyer belt 98 is positioned adjacent the second end 96 of the fifth laterally extending conveyer belt 92, and the second end 102 of the fifth longitudinally extending conveyer belt 98 is positioned adjacent the central portion 52 of the second laterally extending conveyer belt 18.

A third pushing device 106 is mounted adjacent an intersection 108, which is an intersection between the first end 94 of the fifth laterally extending conveyer belt 92 and the fourth longitudinally extending conveyer belt 78. The third pushing device 106 is adapted to selectively push the at least one baggage item to divert the at least one baggage item from traveling on the fourth longitudinally extending conveyer belt 78 to travel on the fifth laterally extending conveyer belt 92. A fourth pickup station 110 is positioned adjacent an intersection 112, which is an intersection between the second end 102 of the fifth longitudinally extending conveyer belt 98 and the second laterally extending conveyer belt 18 for selectively receiving the at least one baggage item.

The sixth laterally extending conveyer belt 114 also has opposed first and second ends 116, 118, respectively, and is adapted to transport the at least one baggage item along the first lateral direction. The first end 116 of the sixth laterally extending conveyer belt 114 is positioned adjacent a central portion 120 of the fifth longitudinally extending conveyer belt 98. A sixth longitudinally extending conveyer belt 122 has opposed first and second ends 124, 126, respectively, and is adapted to transport the at least one baggage item along the first longitudinal direction. The first end 124 of the sixth longitudinally extending conveyer belt 122 is positioned adjacent the second end 118 of the sixth laterally extending conveyer belt 114, and the second end 126 of the sixth longitudinally extending conveyer belt 122 is positioned adjacent the central portion 52 of the second laterally extending conveyer belt 18.

A fourth pushing device 128 is mounted adjacent an intersection 130, which is an intersection between the first end 116 of the sixth laterally extending conveyer belt 114 and the fifth longitudinally extending conveyer belt 98. The fourth pushing device 128 is adapted to selectively push the at least one baggage item to divert the at least one baggage item from traveling on the fifth longitudinally extending conveyer belt 98 to travel on the sixth laterally extending conveyer belt 114. A fifth pickup station 132 is positioned adjacent an intersection 134, which is an intersection between the second end 126 of the sixth longitudinally extending conveyer belt 122 and the second laterally extending conveyer belt 18 for selectively receiving the at least one baggage item.

The seventh laterally extending conveyer belt 136 has opposed first and second ends 138, 140, respectively, and is adapted to transport the at least one baggage item along the second lateral direction. The first end 138 of the seventh laterally extending conveyer belt 136 is positioned adjacent a central portion 148 of the sixth longitudinally extending conveyer belt 122. A seventh longitudinally extending conveyer belt 142 has opposed first and second ends 144, 146, respectively, and is adapted to transport the at least one baggage item along the first longitudinal direction. The first end 144 of the seventh longitudinally extending conveyer belt 142 is positioned adjacent the second end 140 of the seventh laterally extending conveyer belt 136, and the second end 146 of the seventh longitudinally extending conveyer belt 142 is positioned adjacent the central portion 52 of the second laterally extending conveyer belt 18.

A fourth pushing device 150 is mounted adjacent an intersection 152, which is an intersection between the first end 138 of the seventh laterally extending conveyer belt 136 and the sixth longitudinally extending conveyer belt 122. The fourth pushing device 150 is adapted to selectively push the at least one baggage item to divert the at least one baggage item from traveling on the sixth longitudinally extending conveyer belt 122 to travel on the seventh laterally extending conveyer belt 136. A sixth pickup station 154 is positioned adjacent an intersection 156, which is an intersection between the second end 146 of the seventh longitudinally extending conveyer belt 142 and the second laterally extending conveyer belt 18 for selectively receiving the at least one baggage item.

As further shown in FIG. 1, additional paths may be added. For example, eighth and ninth longitudinally extending conveyer belts 162, 174, each traveling in the first longitudinal direction, intersect with first laterally extending conveyer belt 12, close to first end 14 thereof. Baggage items may be selectively diverted to either of the eighth or ninth longitudinally extending conveyer belts 162, 174 by fifth or sixth pushing devices 160, 172, respectively. As shown, rather than traveling continuously to seventh and eighth pickup stations 170, 182, respectively, baggage items can be selectively slowed by entering loops 164, 176. Until a passenger is ready to receive his or her baggage, the baggage can travel within one of loops 164, 176. When the passenger is ready to receive the luggage, seventh or eighth pushing devices 166, 178 can be selectively deployed to respectively divert the baggage onto tenth and eleventh longitudinally extending conveyer belts 168, 180, which respectively terminate at the seventh and eighth pickup stations 170, 182. It should be clear that although FIG. 1 depicts eight separate paths, leading to the first through eighth pickup stations 60, 62, 84, 110, 132, 154, 170, 182, the overall number of paths may be increased or decreased, with a preferable minimum of paths and pickup stations of three. Further, it should be understood that the widths of the various conveyer belts, and the overall configurations of the pushing devices, may be varied in order to accommodate baggage of varying sizes. Similarly, the pickup stations may be varied in capacity and configuration in order to receive baggage of varying sizes and styles.

As shown in FIG. 1, each of the pushing devices, as well as the scanner 54, are in communication with controller 210. Controller 210 may be any suitable type of computer, processor, programmable logic controller or the like. When baggage items are initially scanned by scanner 54, which may be a barcode scanner, a radio frequency identification (RFID) scanner, a quick response (QR) code scanner or the like, corresponding identification tags on the baggage items are read and controller 210 associates each item of baggage with its authorized passenger for pickup. Controller 210 assigns one of the pickup stations to the authorized passenger associated with one or more baggage items and then routes the baggage item(s) to that pickup station by selective actuation of the pushing devices. It should be understood that the identification tags may be any suitable type of identification tags for passive or active information storage.

Figure 2B:
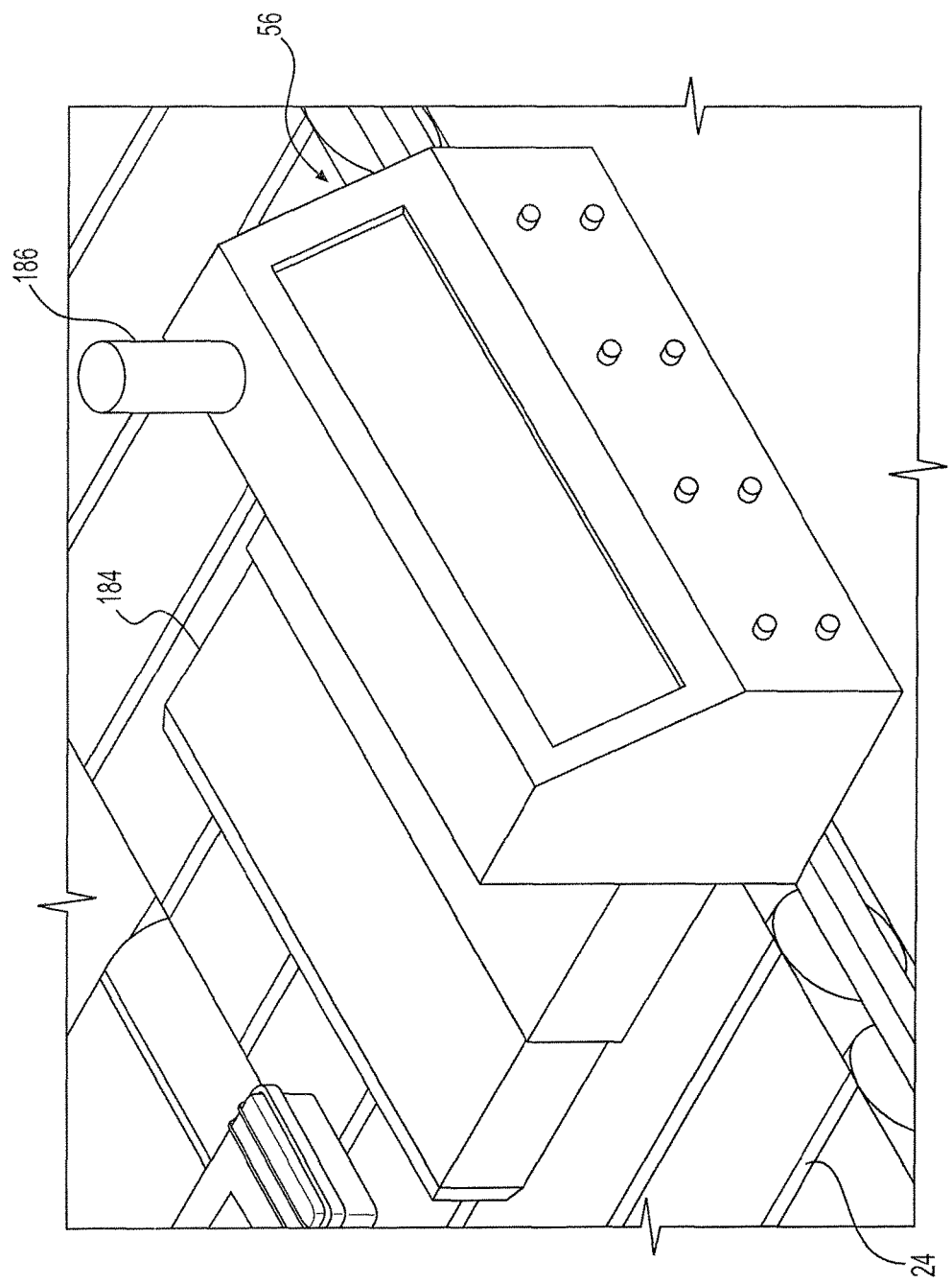
FIG. 2B is a perspective view of the pushing device of FIG. 2A, shown in a deployed state.

FIG. 2A shows first pushing device 56, although it should be understood that each pushing device operates in a substantially identical manner. As shown in FIG. 2B, when controller 210 actuates first pushing device 56, a push plate 184 extends therefrom, onto the adjacent conveyer belt 24, to divert the baggage item in a direction perpendicular to that of conveyer belt 24. Push plate 184 may be driven to extend by any suitable type of actuator, such as a linear actuator, pneumatic actuator or the like. It should be understood that the overall configuration, contouring and relative dimensions of first pushing device 56 and push plate 184 are shown for exemplary purposes only. Additionally, a detector

186 may be mounted on, or adjacent to, first pushing device 56. Detector 186 may be a motion detector, a scanner (similar to scanner 54) or the like, providing for precision timing for the actuation of push plate 184 to ensure that push plate 184 contacts the baggage item completely and securely.

Figure 3A:
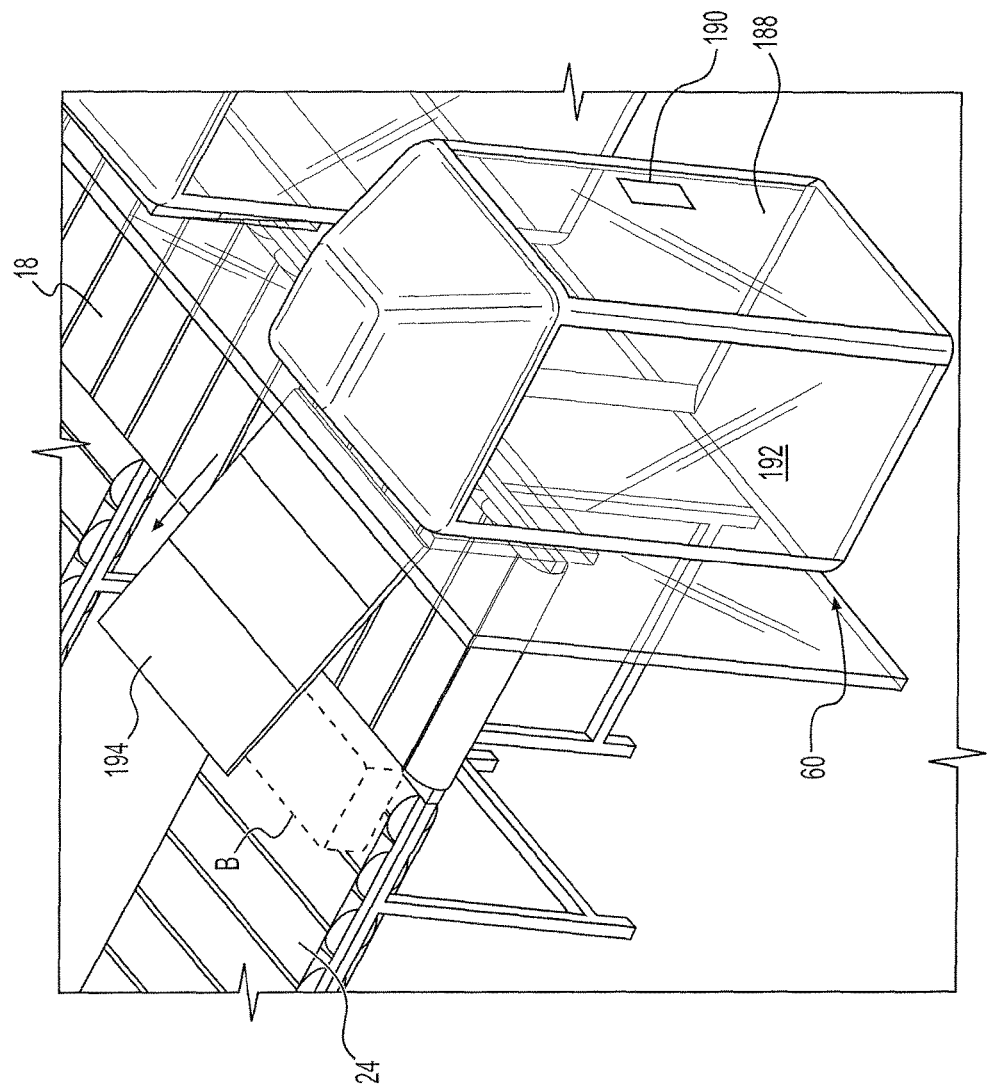

FIG. 3A shows first pickup station 60, however, it should be understood that each of the pickup stations are substantially identical to one another. As shown, first pickup station 60 has at least one sidewall 192, a front door 188 and a rear door 194. It should be understood that the generally rectangular contouring of the at least one sidewall 192 is shown for exemplary purposes only. As shown, front door 188 is provided with a locking mechanism 190, which may include an optical scanner or the like, allowing the front door 188 to be unlocked only upon scanning of a baggage claim ticket or other form of identification or authentication associated with the authorized passenger. Locking mechanism 190 may be under the control of controller 210. Additionally, similar to detectors 186 described above, each pickup station may also be equipped with a motion detector, a scanner or the like, providing for precision timing for the actuation of rear door 194 to ensure that the baggage item is completely and securely pulled into the pickup station.

Figure 3C:
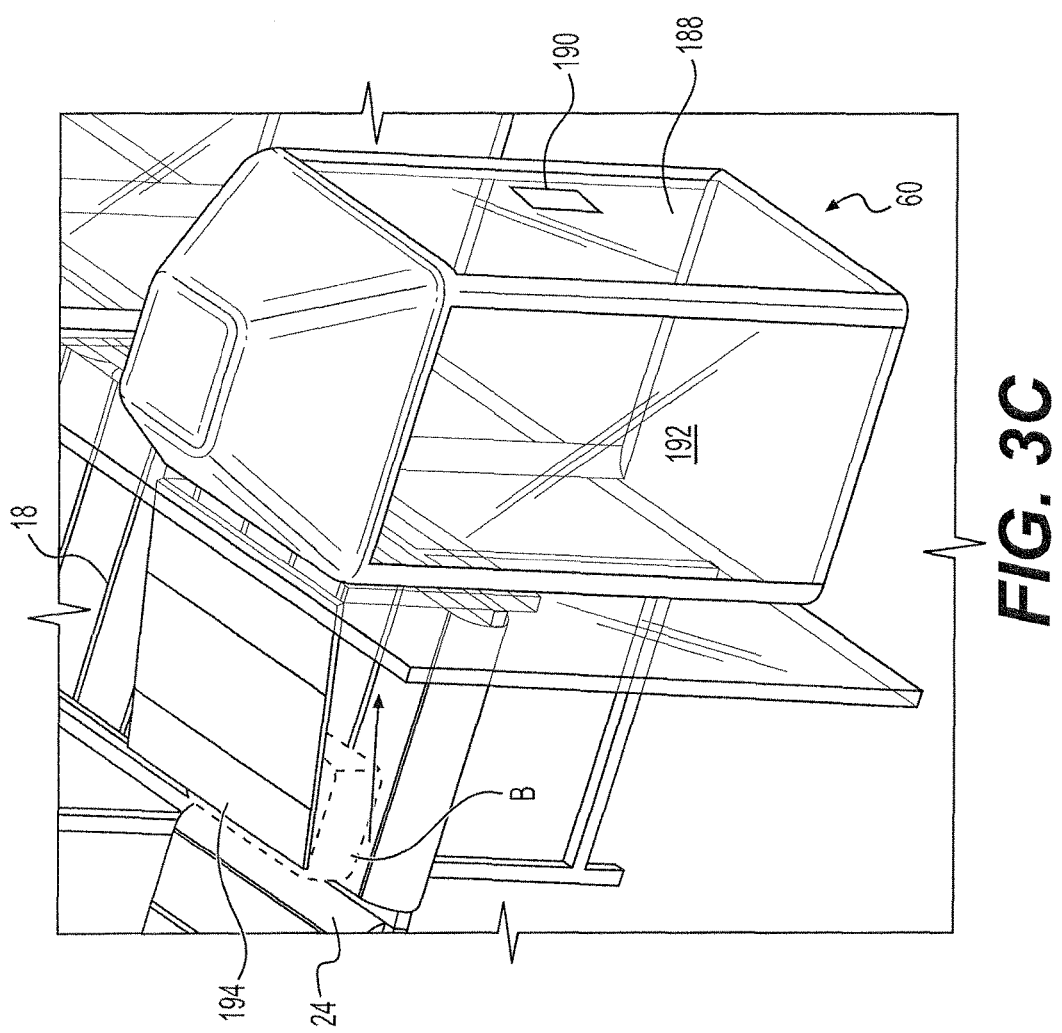

As shown in FIG. 3A, rear door 194 may be driven both telescopically and pivotally. In FIG. 3A, when baggage item B approaches rear door 194, rear door 194 is both fully extending in a linear direction and is also pivoted upwardly to receive baggage item B. Telescopic extension and pivoting of rear door 194 may be driven by any suitable type of drive systems, such as linear actuators, pneumatic actuators, motors, belts, chains, etc. As shown in FIG. 3B, the rear door 194, still in its fully extended state, is driven to pivot downwardly, contacting baggage item B. As shown in FIG. 3C, once contact is made with baggage item B, the rear door 194 can then be driven to retract, pulling the baggage item B into the pickup station 60. The extension/retraction and pivoting of rear door 194 may be under the control of controller 210.

Figure 4A:
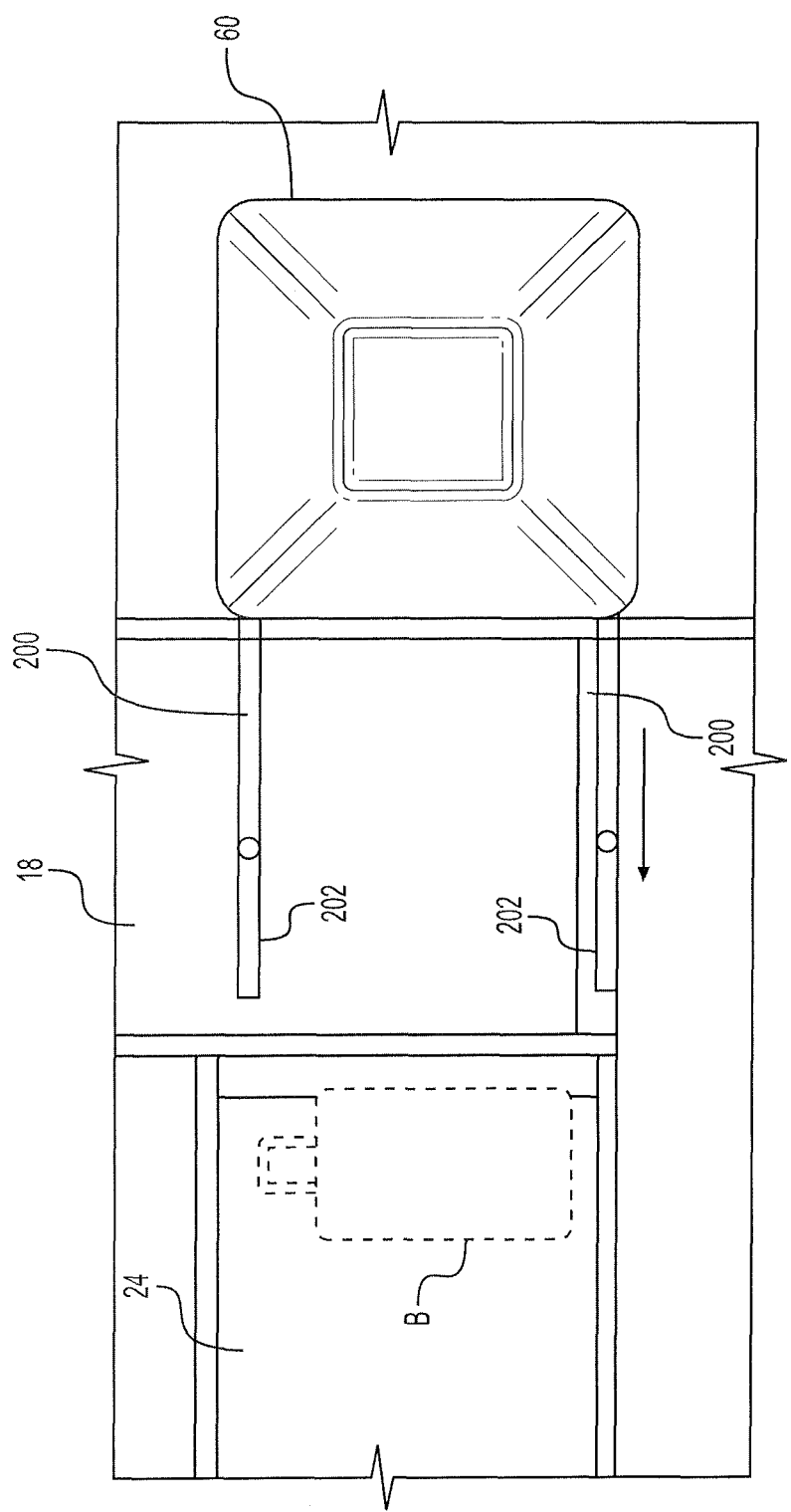
FIG. 4A, FIG. 4B and FIG. 4C are plan views of an alternative embodiment of the pickup station of the baggage handling and delivery system, illustrating successive steps for receiving a baggage item.
Figure 4B:
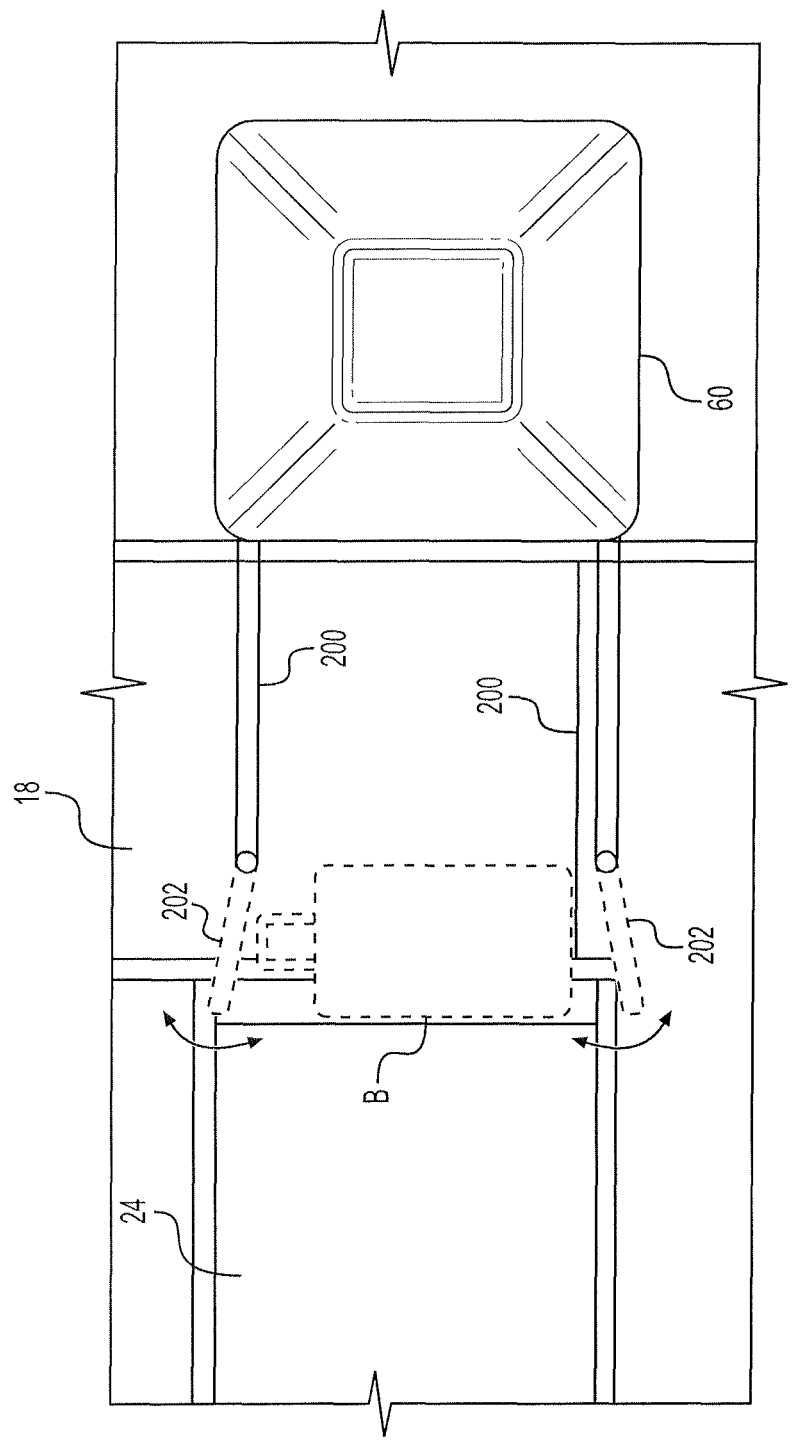
Figure 4C:
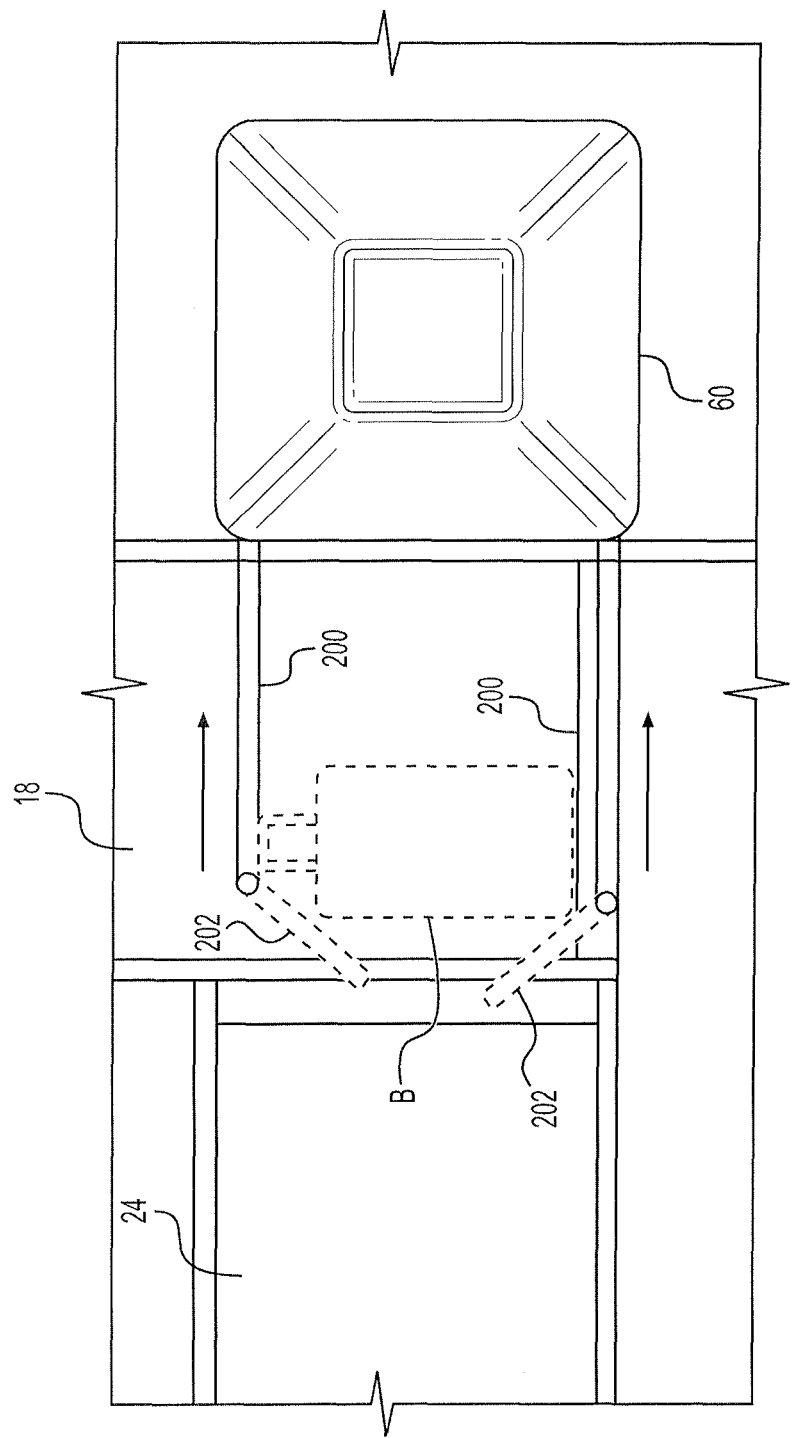

In the alternative embodiment of FIG. 4A, a pair of arms 200 replace the rear door 194 of the previous embodiment. As baggage item B approaches the pickup station 60, arms 200 are extended. Each arm 200 has a pivoting free end 202. As shown in FIG. 4B, the pivoting free end 202 can pivot either toward or away from the baggage item B, depending on the particular dimensions of baggage item B, i.e., free ends 202 may pivot to securely accommodate and contact baggage item B. Once baggage item B is securely positioned therebetween, the free ends 202 are driven to pivot inwardly, as shown in FIG. 4C, creating a barrier or wall to push the baggage item B toward pickup station 60. The arms 200 are retracted to pull the baggage item B into pickup station 60. The extension/retraction of arms 200 and the pivoting of free ends 202 may be driven by any suitable type of drive systems, such as linear actuators, pneumatic actuators, motors, belts, chains, etc. The extension/retraction of arms 200 and the pivoting of free ends 202 may be under the control of controller 210.

It is to be understood that the baggage handling and delivery system is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A baggage handling and delivery system, comprising:
a first laterally extending conveyer belt having opposed first and second ends, the first laterally extending conveyer belt being adapted to transport at least one baggage item along a first lateral direction;
a second laterally extending conveyer belt having opposed first and second ends, the second laterally extending conveyer belt being adapted to transport the at least one baggage item along a second lateral direction, the second lateral direction being opposite the first lateral direction;
a first longitudinally extending conveyer belt having opposed first and second ends, the first end thereof being positioned adjacent the second end of the first laterally extending conveyer belt, the second end of the first longitudinally extending conveyer belt being positioned adjacent the first end of the second laterally extending conveyer belt, the first longitudinally extending conveyer belt being adapted to transport the at least one baggage item along a first longitudinal direction;
a second longitudinally extending conveyer belt having opposed first and second ends, the first end thereof being positioned adjacent the second end of the second laterally extending conveyer belt, the second end of the second longitudinally extending conveyer belt being positioned adjacent a central portion of the first laterally extending conveyer belt, the second longitudinally extending conveyer belt being adapted to transport the at least one baggage item along a second longitudinally direction, the second longitudinal direction being opposite the first longitudinal direction;
a third laterally extending conveyer belt having opposed first and second ends, the third laterally extending conveyer belt being adapted to transport the at least one baggage item along the second lateral direction, the first end of the third laterally extending conveyer belt being positioned adjacent a central portion of the first longitudinally extending conveyer belt;
a third longitudinally extending conveyer belt having opposed first and second ends, the third longitudinally extending conveyer belt being adapted to transport the at least one baggage item along the first longitudinal direction, the first end of the third longitudinally extending conveyer belt being positioned adjacent the second end of the third laterally extending conveyer belt, the second end of the third longitudinally extending conveyer belt being positioned adjacent a central portion of the second laterally extending conveyer belt;
a scanner positioned adjacent the first end of the first laterally extending conveyer belt for reading identifying information associated with the at least one baggage item;
a first pushing device mounted adjacent an intersection between the first longitudinally extending conveyer belt and the first end of the third laterally extending conveyer belt, the first pushing device being adapted to selectively push the at least one baggage item to divert the at least one baggage item from traveling on the first longitudinally extending conveyer belt to travel on the third laterally extending conveyer belt;
a first pickup station positioned adjacent an intersection between the second end of the first longitudinally extending conveyer belt and the second laterally extending conveyer belt for selectively receiving the at least one baggage item; and a second pickup station positioned adjacent an intersection between the second end of the third longitudinally extending conveyer belt and the second laterally extending conveyer belt for selectively receiving the at least one baggage item.

2. The baggage handling and delivery system as recited in claim 1, further comprising a fourth laterally extending conveyer belt having opposed first and second ends, the fourth laterally extending conveyer belt being adapted to transport the at least one baggage item along the first lateral direction, the first end of the fourth laterally extending conveyer belt being positioned adjacent a central portion of the third longitudinally extending conveyer belt.

3. The baggage handling and delivery system as recited in claim 2, further comprising a fourth longitudinally extending conveyer belt having opposed first and second ends, the fourth longitudinally extending conveyer belt being adapted to transport the at least one baggage item along the first longitudinal direction, the first end of the fourth longitudinally extending conveyer belt being positioned adjacent the second end of the fourth laterally extending conveyer belt, the second end of the fourth longitudinally extending conveyer belt being positioned adjacent the central portion of the second laterally extending conveyer belt.

4. The baggage handling and delivery system as recited in claim 3, further comprising a second pushing device mounted adjacent an intersection between the first end of the fourth laterally extending conveyer belt and the third longitudinally extending conveyer belt, the second pushing device being adapted to selectively push the at least one baggage item to divert the at least one baggage item from traveling on the third longitudinally extending conveyer belt to travel on the fourth laterally extending conveyer belt.

5. The baggage handling and delivery system as recited in claim 4, further comprising a third pickup station positioned adjacent an intersection between the second end of the fourth longitudinally extending conveyer belt and the second laterally extending conveyer belt for selectively receiving the at least one baggage item.

6. The baggage handling and delivery system as recited in claim 5, further comprising a fifth laterally extending conveyer belt having opposed first and second ends, the fifth laterally extending conveyer belt being adapted to transport the at least one baggage item along the second lateral direction, the first end of the fifth laterally extending conveyer belt being positioned adjacent a central portion of the fourth longitudinally extending conveyer belt.

7. The baggage handling and delivery system as recited in claim 6, further comprising a fifth longitudinally extending conveyer belt having opposed first and second ends, the fifth longitudinally extending conveyer belt being adapted to transport the at least one baggage item along the first longitudinal direction, the first end of the fifth longitudinally extending conveyer belt being positioned adjacent the second end of the fifth laterally extending conveyer belt, the second end of the fifth longitudinally extending conveyer belt being positioned adjacent the central portion of the second laterally extending conveyer belt.

8. The baggage handling and delivery system as recited in claim 7, further comprising a third pushing device mounted adjacent an intersection between the first end of the fifth laterally extending conveyer belt and the fourth longitudinally extending conveyer belt, the third pushing device being adapted to selectively push the at least one baggage item to divert the at least one baggage item from traveling on the fourth longitudinally extending conveyer belt to travel on the fifth laterally extending conveyer belt.

9. The baggage handling and delivery system as recited in claim 8, further comprising a fourth pickup station positioned adjacent an intersection between the second end of the fifth longitudinally extending conveyer belt and the second laterally extending conveyer belt for selectively receiving the at least one baggage item.

10. The baggage handling and delivery system as recited in claim 9, further comprising a sixth laterally extending conveyer belt having opposed first and second ends, the sixth laterally extending conveyer belt being adapted to transport the at least one baggage item along the first lateral direction, the first end of the sixth laterally extending conveyer belt being positioned adjacent a central portion of the fifth longitudinally extending conveyer belt.

11. The baggage handling and delivery system as recited in claim 10, further comprising a sixth longitudinally extending conveyer belt having opposed first and second ends, the sixth longitudinally extending conveyer belt being adapted to transport the at least one baggage item along the first longitudinal direction, the first end of the sixth longitudinally extending conveyer belt being positioned adjacent the second end of the sixth laterally extending conveyer belt, the second end of the sixth longitudinally extending conveyer belt being positioned adjacent the central portion of the second laterally extending conveyer belt.

12. The baggage handling and delivery system as recited in claim 11, further comprising a fourth pushing device mounted adjacent an intersection between the first end of the sixth laterally extending conveyer belt and the fifth longitudinally extending conveyer belt, the fourth pushing device being adapted to selectively push the at least one baggage item to divert the at least one baggage item from traveling on the fifth longitudinally extending conveyer belt to travel on the sixth laterally extending conveyer belt.

13. The baggage handling and delivery system as recited in claim 12, further comprising a fifth pickup station positioned adjacent an intersection between the second end of the sixth longitudinally extending conveyer belt and the second laterally extending conveyer belt for selectively receiving the at least one baggage item.

14. The baggage handling and delivery system as recited in claim 13, further comprising a seventh laterally extending conveyer belt having opposed first and second ends, the seventh laterally extending conveyer belt being adapted to transport the at least one baggage item along the second lateral direction, the first end of the seventh laterally extending conveyer belt being positioned adjacent a central portion of the sixth longitudinally extending conveyer belt.

15. The baggage handling and delivery system as recited in claim 14, further comprising a seventh longitudinally extending conveyer belt having opposed first and second ends, the seventh longitudinally extending conveyer belt being adapted to transport the at least one baggage item along the first longitudinal direction, the first end of the seventh longitudinally extending conveyer belt being positioned adjacent the second end of the seventh laterally extending conveyer belt, the second end of the seventh longitudinally extending conveyer belt being positioned adjacent the central portion of the second laterally extending conveyer belt.

16. The baggage handling and delivery system as recited in claim 15, further comprising a fourth pushing device mounted adjacent an intersection between the first end of the seventh laterally extending conveyer belt and the sixth longitudinally extending conveyer belt, the fourth pushing device being adapted to selectively push the at least one baggage item to divert the at least one baggage item from traveling on the sixth longitudinally extending conveyer belt to travel on the seventh laterally extending conveyer belt.

17. The baggage handling and delivery system as recited in claim 16, further comprising a sixth pickup station positioned adjacent an intersection between the second end of the seventh longitudinally extending conveyer belt and the second laterally extending conveyer belt for selectively receiving the at least one baggage item.

18. The baggage handling and delivery system as recited in claim 1, wherein each of the first and second pickup stations has at least one sidewall, a rear door and a front door.

19. The baggage handling and delivery system as recited in claim 18, wherein the front door is selectively lockable.

20. The baggage handling and delivery system as recited in claim 19, wherein each of the first and second pickup stations further comprises at least one selectively extendable and retractable telescopic gripping arm for drawing the at least one baggage item through the rear door.

\* \* \* \* \*